US009180855B2

(12) United States Patent
Georgin

(10) Patent No.: US 9,180,855 B2
(45) Date of Patent: Nov. 10, 2015

(54) BRAKE COOLING ESTIMATION METHODS AND SYSTEMS

(71) Applicant: GOODRICH CORPORATION, Charlotte, NC (US)

(72) Inventor: Marc Jean Claude Georgin, Dayton, OH (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 14/177,884

(22) Filed: Feb. 11, 2014

(65) Prior Publication Data

US 2015/0224974 A1 Aug. 13, 2015

(51) Int. Cl.
*B60W 10/18* (2012.01)
*B60T 8/00* (2006.01)
*F16D 66/00* (2006.01)
*F16D 65/78* (2006.01)
*B60T 17/22* (2006.01)

(52) U.S. Cl.
CPC ........................... *B60T 17/22* (2013.01)

(58) Field of Classification Search
USPC .............. 701/32.9, 70, 1; 188/1.11, 2 R, 264, 188/71.6
See application file for complete search history.

(56) References Cited

U.S. PATENT DOCUMENTS

| 8,151,944 | B2 | 4/2012 | Waltz | |
|---|---|---|---|---|
| 2002/0029939 | A1* | 3/2002 | Bunker | 188/18 A |
| 2014/0175871 | A1* | 6/2014 | Kim et al. | 307/10.1 |

* cited by examiner

*Primary Examiner* — Yonel Beaulieu
(74) *Attorney, Agent, or Firm* — Snell & Wilmer L.L.P.

(57) ABSTRACT

Systems and methods for estimating the cooling time of a brake assembly are disclosed. Various systems and methods may include receiving a temperature of a brake assembly, determining a peak brake assembly temperature, determining a temperature decay coefficient ("α") of the brake assembly, calculating an estimated total time to cool the brake assembly to a predetermined temperature based on the peak brake assembly temperature and an ambient temperature data, and adjusting the estimated total time to cool the brake assembly to the predetermined temperature based on an amount of time elapsed after the receiving the temperature of the brake assembly.

13 Claims, 4 Drawing Sheets

BRAKE COOLING ESTIMATION METHODS AND SYSTEMS

FIELD

The present disclosure relates to methods and systems for the estimation of cooling time for brakes.

BACKGROUND

During brake use, such as during an aircraft landing, brakes convert kinetic energy of a moving vehicle into, among other things, thermal energy. Brake temperatures thus rise during braking. In aircraft brakes, brakes may reach high temperatures (e.g. well above 1,000° F.). After a landing or other use of aircraft brakes, it is preferable to allow the aircraft brake temperature to cool to a predetermined temperature prior to attempting a take-off. In that manner, if a take-off is aborted, the aircraft brakes may more safely accept the heat associated with a "rejected take-off" ("RTO"). An RTO refers generally to engagement of aircraft brakes during an aborted take-off. Typically, a RTO includes high braking loads over a short time period, which in turn correlates to a rapid increase in brake temperature. If aircraft brakes above the predetermined temperature are used in an RTO, brake malfunction may become more likely. Waiting a fixed period of time between landing and take-off tends to lead to wasted time, as the brakes may have cooled to the predetermined temperature prior to the end of the waiting period.

SUMMARY

Systems are provided comprising a processor, a tangible, non-transitory memory configured to communicate with the processor, the tangible, non-transitory memory having instructions stored thereon that, in response to execution by the processor, cause the processor to perform operations comprising receiving a temperature of a brake assembly, determining a peak brake assembly temperature, determining a temperature decay coefficient ("α") of the brake assembly, calculating an estimated total time to cool the brake assembly to a predetermined temperature based on the peak brake assembly temperature and an ambient temperature data, and adjusting the estimated total time to cool the brake assembly to the predetermined temperature based on an amount of time elapsed after the receiving the temperature of the brake assembly.

Methods disclosed include receiving, by a brake control system unit ("BCSU") comprising a processor and a tangible, non-transitory memory, a temperature of the brake assembly, determining, by the BCSU, a peak brake assembly temperature, determining, by the BCSU, a temperature decay coefficient ("a") of the brake assembly, calculating, by the BCSU, an estimated total time to cool the brake assembly to a predetermined temperature based on the peak brake assembly temperature and an ambient temperature data, and adjusting, by the BCSU, the estimated total time to cool the brake assembly to a predetermined temperature based on an amount of time elapsed after the receiving the temperature of the brake assembly.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
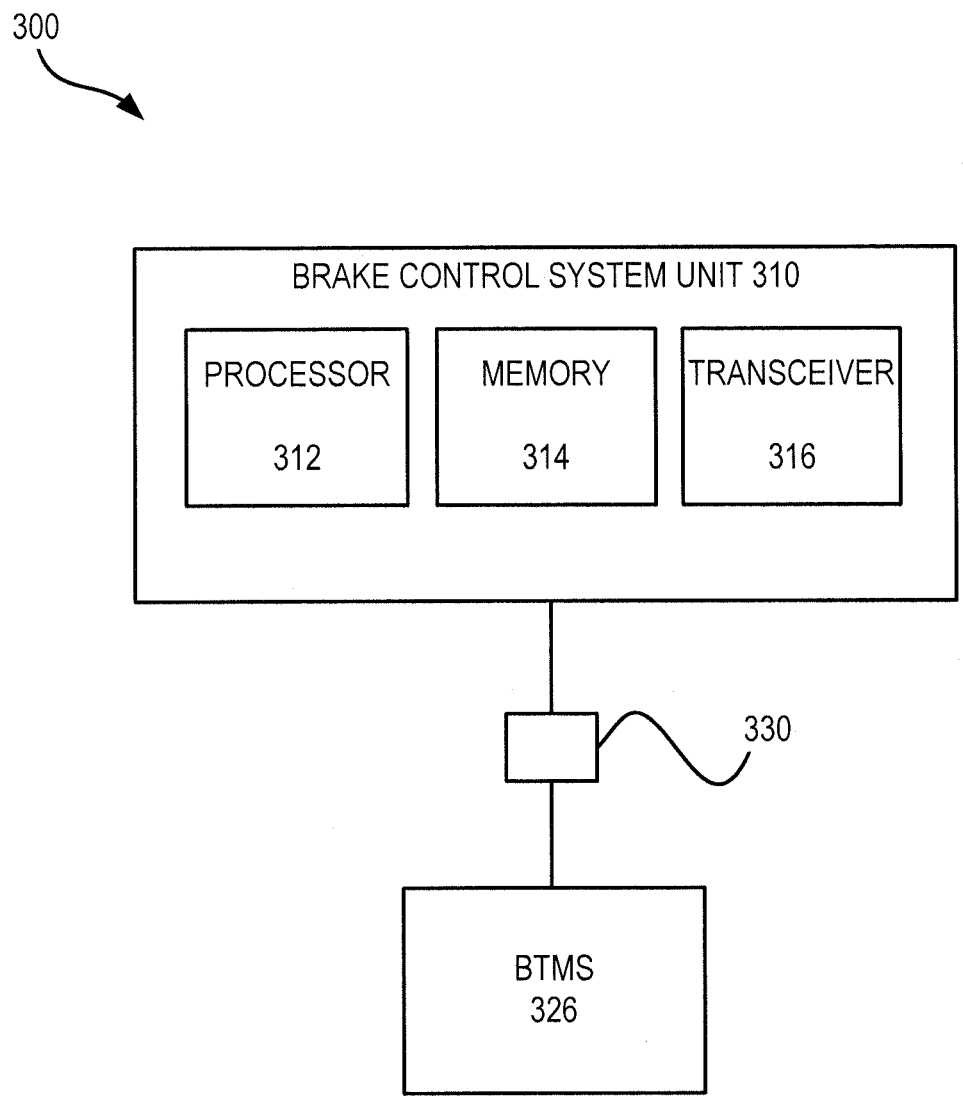
FIG. 1 illustrates a brake control unit, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, electrical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

After a landing or other braking event, it is important to determine how much time should elapse until the brakes are below a predetermined temperature to allow for a safe take-off. Waiting for too long a period tends to waste time, which is not acceptable in the time-sensitive aviation industry. Waiting for too short a period may compromise aviation safety.

The thermodynamics of a brake assembly (i.e., brake heat sink, pressure plate, and/or other components) are complex systems to model. Sophisticated models that incorporate many environmental variables and other data may be used with a high level of accuracy. However, such sophisticated models are associated with systems that are capable of providing a wide number of environmental variables and utilize significant processor and memory overhead. Such systems also tend to rely on a constant power supply during operation. Thus, power interruption may impair the ability of such a system to function.

After a brake assembly has reached a peak temperature, calculating an estimated total time to cool may be simplified with the assumption that the cooling profile of the brake assembly mainly follows a convective process. Accordingly, in various embodiments, the rate of heat dissipation of the brake assembly is proportional to the difference in temperature between the brake assembly temperature and an ambient temperature, represented by the following equation:

$$\frac{dQ}{dt} = K \cdot (T_{BTMS}(t) - T_{amb})$$

where Q is the quantity of heat exchanged between the brake assembly and the ambient air, K is a heat transfer constant, $T_{BTMS}(t)$ is the temperature of the brake assembly at time t, for example, as measured by the brake temperature monitoring system, and $T_{amb}$ is the ambient air temperature.

Accordingly, the temperature decay of the brake assembly may follow an exponential curve according to the following equation $$T_{BTMS}(t) = T_{init} \cdot e^{-\alpha t} + T_{amb}$$

where $T_{init}$ is the peak temperature of the brake assembly, α is a temperature decay coefficient greater than zero, $T_{BTMS}(t)$ is the temperature of the brake assembly at time t, and $T_{amb}$ is the ambient air temperature.

Accordingly, in various embodiments, the temperature of the brake assembly for two samples obtained at time $t_1$ and time $t_2$ may be exemplified by the equations below $$T_{BTMS}(t_1) = T_{init} \cdot e^{-\alpha t_1} + T_{amb}$$

$$T_{BTMS}(t_2) = T_{init} \cdot e^{-\alpha t_2} + T_{amb}$$

where $T_{BTMS}(t_1)$ is the temperature of the brake assembly at a first time ("$t_1$"), $T_{BTMS}(t_2)$ is the temperature of the brake assembly at second time ("$t_2$"). Thus, the temperature relationships between any two temperatures at their respective received time may be obtained by taking the ratio of the two equations.

Accordingly, in various embodiments, by using the ratio of the temperature of the brake assembly for two samples, a may be determined and satisfy the equation $$\alpha = \frac{1}{t_1 - t_2} \cdot \ln\left(\frac{T_2 - T_{amb}}{T_1 - T_{amb}}\right)$$

wherein $T_1$ is a temperature of the brake assembly at a first time ("$t_1$"), $T_2$ is a temperature of the brake assembly at a second time ("$t_2$"), and $T_{amb}$ is the ambient temperature data.

According to various embodiments, by receiving the brake assembly temperature to determine a peak temperature value, the initial condition for estimating the total time to cool a brake assembly may be set to the peak temperature of the brake assembly (e.g., t=0 and $T_{Peak}=T_0$). With the initial condition set to the peak condition, the temperature decay coefficient α[n] may satisfy the following equation $$\alpha[n] = \frac{1}{t_n} \cdot \ln\left(\frac{T_{init}}{T_n - T_{amb}}\right)$$

wherein $t_n$ is a time after the peak brake assembly temperature, $T_n$ is a temperature of the brake assembly at time $t_n$, $T_{init}$ is the peak brake assembly temperature, and $T_{amb}$ is the ambient temperature data.

Furthermore, in various embodiments, if a maximum safe brake assembly temperature is predetermined, the estimated total time to cool the brake assembly to the predetermined temperature may be estimated with the following equation $$t_{Cool}[n] = \frac{1}{\alpha[n]} \cdot \ln\left(\frac{T_{init}}{T_{Cool} - T_{amb}}\right)$$

wherein $t_{Cool}[n]$ is the estimated total time to cool the brake assembly to the predetermined temperature ("$T_{Cool}$") at time interval n, $T_{init}$ is the peak brake assembly temperature, and $T_{amb}$ is the ambient temperature data.

In various embodiments, due to various factors (e.g., noise, rounding errors, etc.), the estimated total time to cool the brake assembly may be filtered with a low-pass filter to provide a smooth and/or continuous estimation. The particular type of low-pass filter is not particularly limited and can include any digital filter. For example, various low-pass filters can include first order low-pass filters, second order low-pass filters, third order low pass filters, etc. Furthermore, the low-pass filters can include smoothing parameters, such as a tuning parameter.

For example, in various embodiments, the low-pass filter may comprise the equation $$t_{Cool\_Filt}[i] = t_{Cool\_Filt}[i-1] + \beta \cdot (t_{Cool}[i] - t_{Cool}[i-1])$$

wherein $t_{Cool\_Filt}[i]$ is a first order low-pass filter value at a time interval i, $t_{Cool\_Filt}[i-1]$ is a first order low-pass filter value at a time interval preceding the time interval i, β is a smoothing constant, $t_{Cool}[i]$ is the estimated total time to cool the brake assembly to a predetermined temperature at time interval i, and $t_{Cool}[i-1]$ is the estimated total time to cool the brake assembly to a predetermined temperature at a time interval preceding the time interval i.

As described above, the estimated total time to cool is the period of time from the time of the peak temperature measurement (i.e., t=0) to the time when the brakes reach the predetermined temperature. In that regard, it may be useful to adjust the estimated total time to cool to compensate for the time that has elapsed since the time of the peak temperature measurement. Accordingly, in various embodiments, the estimated total time to cool may be adjusted by the equation $$t_{Cool}[n] = t_{Cool\_Filt}[n] - n \cdot P$$

wherein $t_{Cool}[n]$ is the adjusted estimated time to cool the brake assembly to a predetermined temperature at time interval n, $t_{Cool\_Filt}[n]$ is the low-pass filter value at a time interval n, and P is a sampling period. The sampling period is not particularly limited and, in various embodiments, may include periods of 5 minutes, 2 minutes, 1 minute, 45 seconds, 30 seconds, and 15 seconds. In various embodiments, a brake control system unit ("BCSU") or other processor may adjust the estimated total time to cool the brake assembly with a low-pass filter for each new period.

In various embodiments after the adjusted estimation is calculated, for example by a processor (e.g., a processor in a BCSU), various systems and methods include reporting the adjusted estimation with an output device. According to various embodiments, the output device may be in at least one of electrical communication and radio frequency ("RF") communication with the processor, for example, the processor of a BCSU. It has also been found that in various embodiments, the conventional requirement of a minimum estimated cooling time (e.g., 5 minutes) can be eliminated on various output devices. Without be limited to any theory, it is believed that in various embodiments, as the estimated temperature converges with the actual temperature of the brake assembly, the error in estimation is reduced, thus, providing a smoother and a more continuous estimation in output devices. Accordingly, because the error in estimation is reduced as the actual temperature approaches the predetermined temperature, minimum cooling time tolerance requirements may be eliminated.

As discussed above, a BCSU or other processor may perform various calculations described herein. A BCSU may be in communication with one or more brake pedals and downstream components that receive commands from the BCSU, either directly or indirectly, to effect and control braking. For example, in various embodiments the BCSU may receive pedal commands, process the pedal commands, and then command and electromechanical actuator controllers (EMACs) and electromechanical brake actuators (EBAs) or command a shutoff valve (SOV) and/or brake servo valves (BSV) in hydraulic brakes.

Referring to FIG. 1, a system 300 is illustrated according to various embodiments. System 300 may comprise BCSU 310. BCSU 310 may comprise a processor 312, a tangible, non-transitory memory 314, a transceiver 316, and may be communicatively connected to brake temperature monitoring system (BTMS) 326, for example through electrical connection 330. Tangible, non-transitory memory 314 may contain logic to allow processor 312 to estimate the cooling time of a brake assembly according to various embodiments. BCSU 310 may thus receive brake temperature from BTMS 326, for example, continuously or in a random access fashion.

Figure 2:
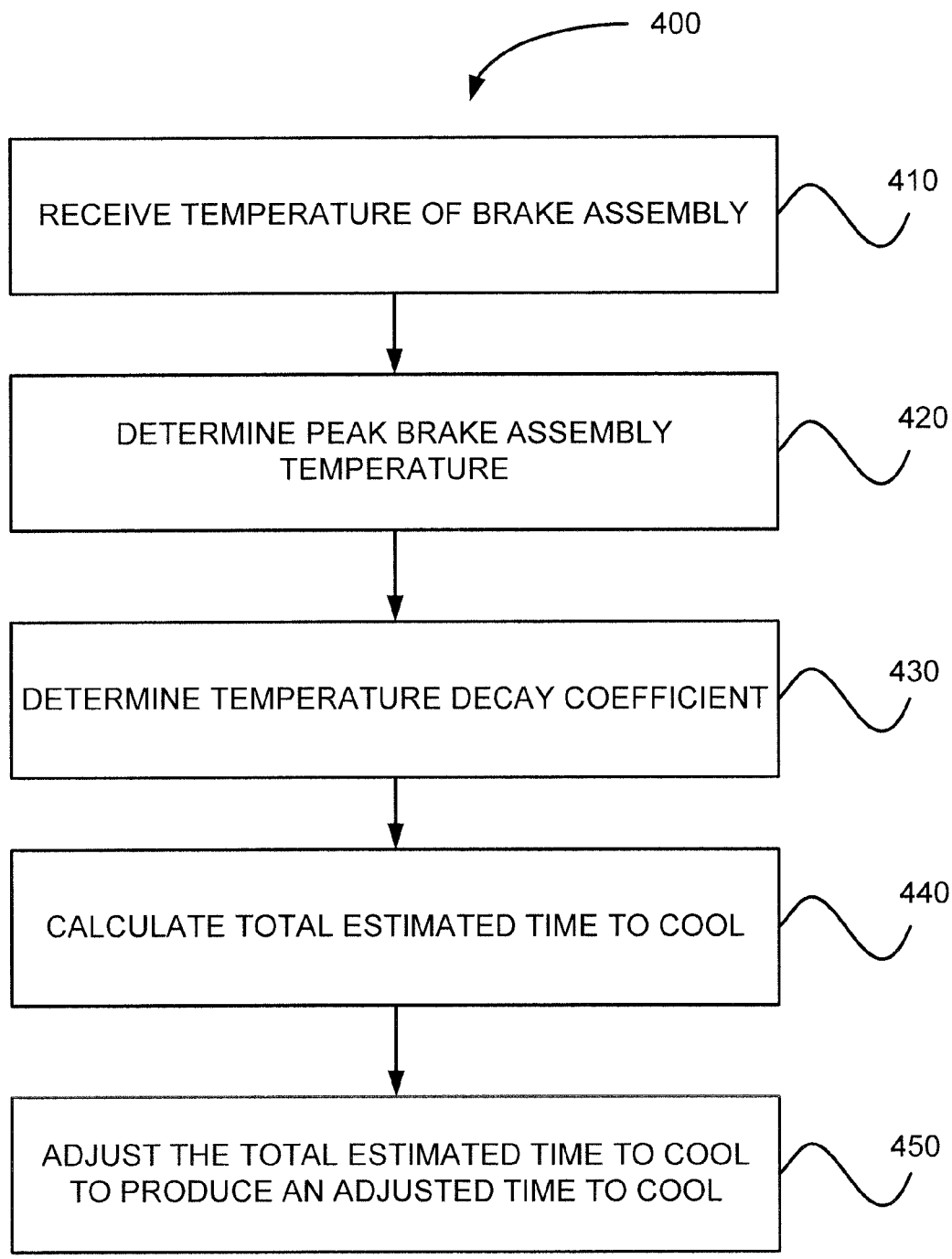
FIG. 2 illustrates a method for estimating the time required to cool a brake assembly, in accordance with various embodiments.

Referring to FIG. 2, method 400 is disclosed for estimating a cooling time of a brake assembly according to various embodiments. In various embodiments, BCSU 310 may receive the temperature of a brake assembly (step 410). The BCSU 310 may then determine a peak brake assembly temperature (step 420). In various embodiments, the BCSU 310 may determine the temperature decay coefficient ("α") of the brake assembly (step 430). As previously discussed, the temperature decay of the brake assembly may follow an exponential curve according to the following equation $$T_{BTMS}(t) T_{init} \cdot e^{-\alpha t} + T_{amb}$$

where $T_{init}$ is the peak temperature of the brake assembly, α is a temperature decay coefficient greater than zero, $T_{BTMS}(t)$ is the temperature of the brake assembly at time t, and $T_{amb}$ is the ambient air temperature. Accordingly, the calculation of the temperature decay coefficient ("α") is not particularly limited and may be calculated in a variety of ways, such as with the use of mathematical equations or a look-up table, according to various embodiments.

For example, according to various embodiments, the temperature decay coefficient ("α") may be determined by using the ratio of the temperature of the brake assembly for two samples. Accordingly, α may satisfy the equation $$\alpha = \frac{1}{t_1 - t_2} \cdot \ln\left(\frac{T_2 - T_{amb}}{T_1 - T_{amb}}\right)$$

wherein $T_1$ is a temperature of the brake assembly at a first time ("$t_1$"), $T_2$ is a temperature of the brake assembly at a second time ("$t_2$"), and $T_{amb}$ is the ambient temperature data.

As yet another example, in various embodiments, when the initial condition is set to the peak condition, the temperature decay coefficient α[n] may satisfy the following equation $$\alpha = \alpha[n] = \frac{1}{t_n} \cdot \ln\left(\frac{T_{init}}{T_n - T_{amb}}\right)$$

wherein $t_n$ is a time after the peak brake assembly temperature, $T_n$ is a temperature of the brake assembly at time $t_n$, $T_{init}$ is the peak brake assembly temperature, and $T_{amb}$ is the ambient temperature data.

Again, with reference to FIG. 2, after determining the temperature decay coefficient (e.g., "α[n]"), the BCSU 310 may calculate an estimated total time to cool (step 440). For example, according to various embodiments, the total estimated total time to cool the brake assembly to the predetermined temperature may be estimated with the following equation $$t_{Cool}[n] = \frac{1}{\alpha[n]} \cdot \ln\left(\frac{T_{init}}{T_{Cool} - T_{amb}}\right)$$

wherein $t_{Cool}[n]$ is the estimated total time to cool the brake assembly to the predetermined temperature ("$T_{Cool}$") at time interval n, $T_{init}$ is the peak brake assembly temperature, and $T_{amb}$ is the ambient temperature data.

After calculating the estimated total time to cool, in various embodiments the BCSU 310 may adjust the estimated total time to cool to produce an adjusted estimated time to cool (step 450). For example, in various embodiments, the BCSU 310 may adjust the estimated total time to cool to compensate for the time that has elapsed since the time of the peak temperature measurement. Furthermore, in various embodiments, the adjustment may include using a filter, such as a low-pass filter. For example, various low-pass filters can include first order low-pass filters, second order low-pass filters, third order low pass filters, etc. Furthermore, the low-pass filters can include smoothing parameters, such as a tuning parameter.

For example, in various embodiments, the estimated time to cool the brake assembly may be filtered with a low-pass filter that may comprise the equation $$t_{Cool\_Filt}[i] = t_{Cool\_Filt}[i-1] + \beta \cdot (t_{Cool}[i] - t_{Cool}[i-1])$$

wherein $t_{Cool\_Filt}[i]$ is a first order low-pass filter value at a time interval i, $t_{Cool\_Filt}[i-1]$ is a first order low-pass filter value at a time interval preceding the time interval i, β is a smoothing constant, $t_{Cool}[i]$ is the estimated total time to cool the brake assembly to a predetermined temperature at time interval i, and $t_{Cool}[i-1]$ is the estimated total time to cool the brake assembly to a predetermined temperature at a time interval preceding the time interval i.

Accordingly, in various embodiments, the estimated total time to cool may be adjusted by the equation $$t_{Cool}[n] = t_{Cool\_Filt}[n] - n \cdot P$$

wherein $t_{Cool}[n]$ is the adjusted estimated time to cool the brake assembly to a predetermined temperature at time interval n, $t_{Cool\_Filt}[n]$ is the low-pass filter value at a time interval n, and P is a sampling period. Exemplary sampling periods according to various embodiments, may include periods of 5 minutes, 2 minutes, 1 minute, 45 seconds, 30 seconds, and 15 seconds.

Figure 3:
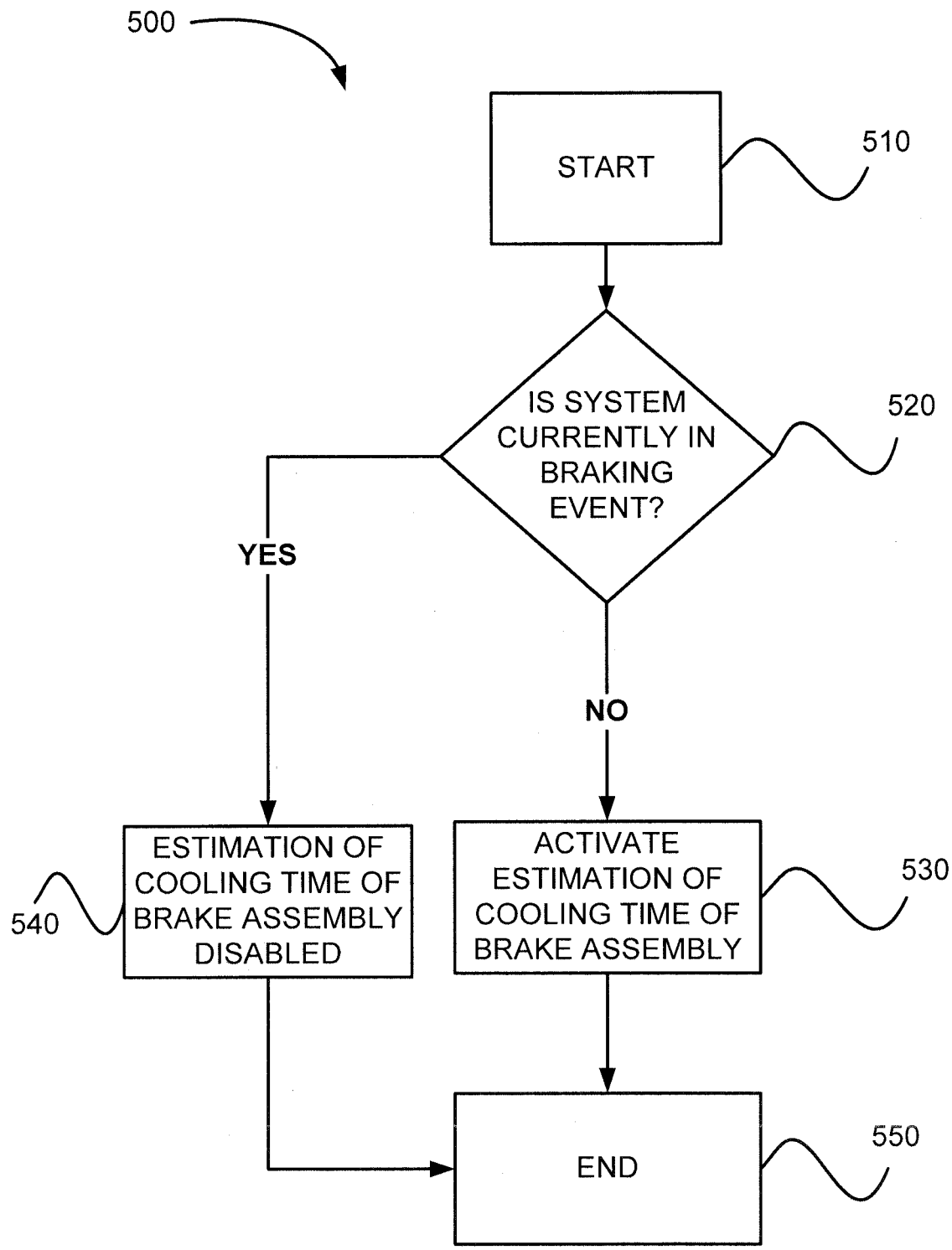
FIG. 3 illustrates a logical flowchart of activation of a system to estimate the time to cool a brake assembly according to various embodiments.

Referring to FIG. 3, a logical flowchart of activation of a system to estimate the time to cool a brake assembly according to various embodiments is illustrated. According to various embodiments, activation method 500 may be used, for example, by a BCSU or other processor to control calculations relevant to the estimation of a time to cool a brake assembly. According to various embodiments, activation method 500 commences at step (step 510). A determination of whether the braking system is currently in a braking event may be made (step 520). If it is determined that the braking system is in a braking event, the estimation of cooling time of the brake assembly is disabled (step 540) and method concludes (step 550). If it is determined that the braking system is not currently in a braking event, then the estimation of cooling time of the brake assembly is activated (step 530) and then the method may conclude (step 550). In various embodiments, activation method 500 may be repeated continuously. In various embodiments, activation method 500 may be repeated after a predetermined condition, such as the passing of a period of time, when power is supplied to the processor, after a braking event, and combinations thereof.

As used herein, the term "braking event," in various embodiments, may refer to any event which imparts energy (e.g., heat) into a brake assembly. Thus, in various embodiments, a braking event would include the application of brakes during landing and taxiing. In various embodiments, application of a parking brake to a stationary aircraft may be excluded from the term "braking event" and, thus, the estimation of time to cool a brake assembly may be activated while the aircraft is parked between flights. According to various embodiments, this may allow maintenance of the aircraft and boarding of the aircraft while systems and methods disclosed herein estimate the cooling time of a brake assembly to a predetermined temperature.

Figure 4:
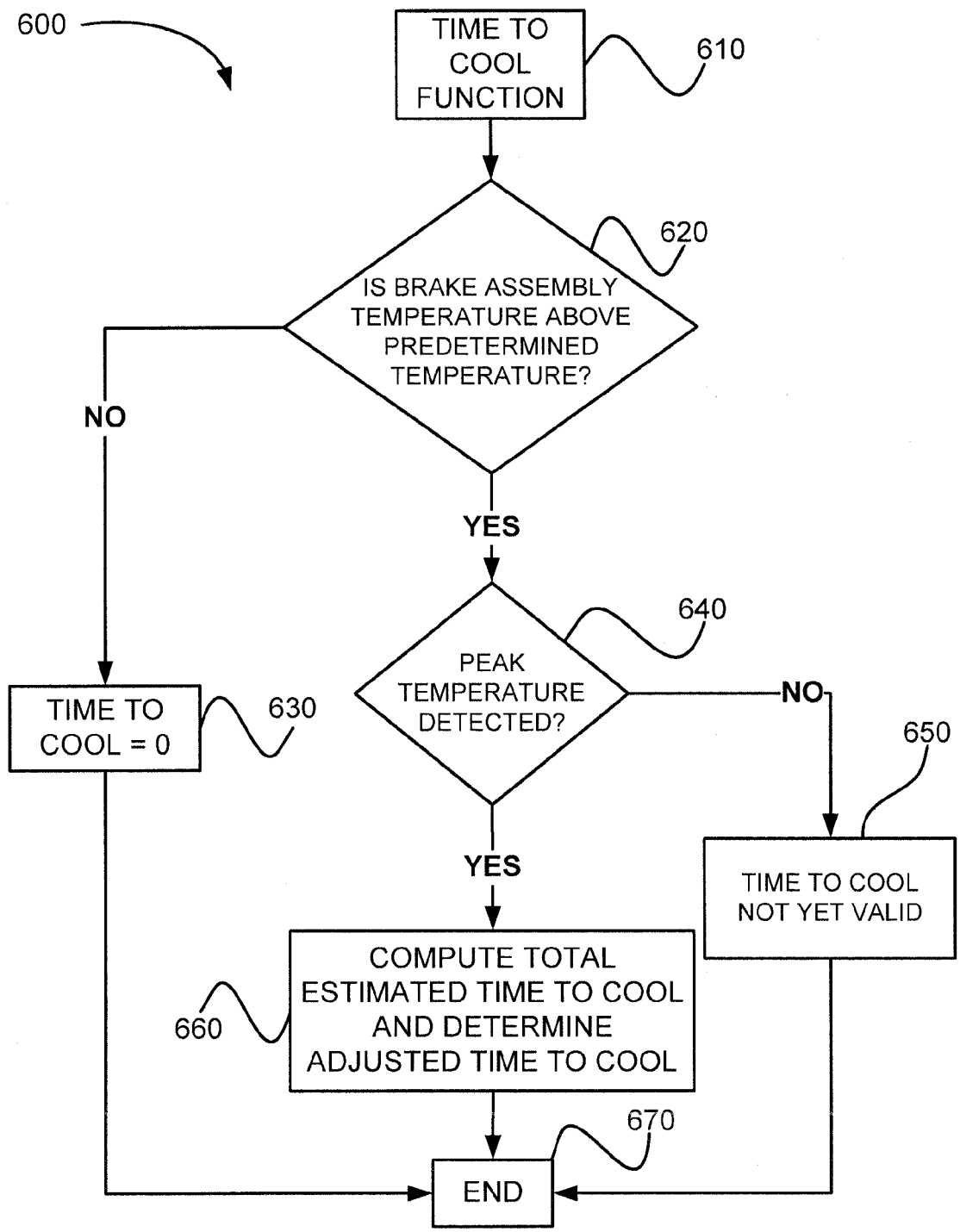
FIG. 4 illustrates a logical flow chart for an output of the estimated time to cool a brake assembly, in accordance with various embodiments.

With reference to FIG. 4, yet another logical flow chart for an output of the estimated time to cool a brake assembly, in accordance with various embodiments, is illustrated. Method 600 may comprise activating a time to cool function for a processor such as in a BCSU (step 610). In various embodiments, the processor may determine whether the brake assembly is above a predetermined temperature (step 620). As used herein, the term "predetermined temperature" may include maximum safe operating temperatures of braking systems for immediate dispatch. If the brake assembly is not above a predetermined temperature, then the output for the time to cool may be set to zero (step 630) and the method may terminate (step 670). In various embodiments, when the brake assembly is not above a predetermined temperature, the indication that the brakes are cool can be indicated by a variety of methods, such as an via an indication light, via a display that may show symbols or words indicating that the brakes are sufficiently cool, etc.

According to various embodiments, when the brake assembly is above a predetermined temperature, the processor may receive (e.g., poll) the temperature data to determine a peak temperature (step 640). According to various embodiments, a peak temperature may be determined by observing a decrease in brake assembly temperature. As described previously, a hysteresis may be used with BTMS temperature data to prevent repeated and constant activation due to temperature fluctuations and/or anomalies. It has been found that in various embodiments, brake temperature data may peak a few minutes after large amounts of braking has occurred. Accordingly, in various embodiments, sampling periods may include periods of 5 minutes, 2 minutes, 1 minute, 45 seconds, 30 seconds, and 15 seconds between each sample to help account for fluctuations in brake assembly temperature and to facilitate determination of the peak temperature.

If no peak temperature is detected, an indication that the time to cool function is not yet valid may be displayed (step 650) and the method may terminate (step 670). In various embodiments, if a peak temperature is detected then the estimated time to cool may be computed and reported (step 660). In various embodiments, the computing of the estimated time to cool may comprise determining a temperature decay coefficient ("α") of the brake assembly, calculating an estimated total time to cool the brake assembly to a predetermined temperature based on the peak brake assembly temperature and an ambient temperature data, and adjusting the estimated total time to cool the brake assembly to determine an adjusted estimated time to cool to the predetermined temperature based on an amount of time elapsed after the receiving the temperature of the brake assembly. In various embodiments, the adjusted estimated time to cool can then be reported (step 660) and the method may terminate (step 670).

With temporary reference to FIGS. 2-4, according to various embodiments, methods 400, 500, 600, and combinations thereof may be repeated to provide updated information on the estimated time to cool the brake assembly. In various embodiments, by repeating various disclosed methods, systems and methods for determining the cooling time for a brake assembly may adapt cooling profiles based on changing environmental conditions. For example, if a pilot takes off with the brakes excessively hot, disclosed systems and methods may inform the pilot how long he/she must fly with the gear extended before retraction. As yet another example, various embodiments may also be able to adapt to changing environmental conditions, for example, if fans are turned on to cool the brakes or if wind conditions are present.

In various embodiments, a hysteresis may be used with BTMS temperature data to prevent repeated and constant activation. Accordingly, in various embodiments, such as those where the cooling time is reported to an output device (e.g., to a control panel in the cockpit), the output device may be prevented from switching on and off repeatedly within a period of time.

Various disclosed systems and methods may be independent of whether the BCSU has been turned off after landing. Accordingly, algorithms may resume once power is restored to disclosed systems allowing for prediction of the time to cool the brake assembly with the new detected initial conditions upon re-power up. In various embodiments, this may allow for more user-friendly systems and methods.

Moreover, disclosed systems and methods according to various embodiments, may require reduced computation from on-board systems as compared to conventional methods, therefore making it easier to maintain memory and other computational equipment. Disclosed methods also reduce the number of tunable parameters when compared to conventional systems and methods.

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. §101, so long as and to the extent In re Nuijten remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system comprising:
   a processor,
   a tangible, non-transitory memory configured to communicate with the processor, the tangible, non-transitory memory having instructions stored thereon that, in response to execution by the processor, cause the processor to perform operations comprising:
   receiving a temperature of a brake assembly;
   determining a peak brake assembly temperature;
   determining a temperature decay coefficient ("α") of the brake assembly, wherein α is greater than zero and satisfies an equation $$\alpha = \frac{1}{t_1 - t_2} \cdot \ln\left(\frac{T_2 - T_{amb}}{T_1 - T_{amb}}\right)$$

wherein $T_1$ is a temperature of the brake assembly at a first time ("$t_1$"), $T_2$ is a temperature of the brake assembly at a second time ("$t_2$"), and $T_{amb}$ is the ambient temperature data;
   calculating an estimated total time to cool the brake assembly to a predetermined temperature based on the peak brake assembly temperature and an ambient temperature data; and
   adjusting the estimated total time to cool the brake assembly to the predetermined temperature based on an amount of time elapsed after the receiving the temperature of the brake assembly.

2. The system according to claim 1, wherein α is greater than zero and satisfies an equation $$\alpha = \alpha[n] = \frac{1}{t_n} \cdot \ln\left(\frac{T_{init}}{T_n - T_{amb}}\right)$$

wherein $t_n$ is a period of time after the peak brake assembly temperature is measured, $T_n$ is a temperature of the brake assembly at time $t_n$, $T_{init}$ is the peak brake assembly temperature, and $T_{amb}$ is the ambient temperature data.

3. The system according to claim 2, wherein the calculating the estimated total time to cool the brake assembly to the predetermined temperature comprises an equation $$t_{Cool}[n] = \frac{1}{\alpha[n]} \cdot \ln\left(\frac{T_{init}}{T_{Cool} - T_{amb}}\right)$$

wherein $t_{Cool}[n]$ is the estimated total time to cool the brake assembly to the predetermined temperature ("$T_{Cool}$") at time interval n, $T_{init}$ is the peak brake assembly temperature, and $T_{amb}$ is the ambient temperature data.

4. The system according to claim 3, wherein the adjusting the estimated total time to cool the brake assembly comprises filtering the estimated total time to cool the brake assembly with a low-pass filter.

5. The system according to claim 4, wherein the filtering the estimated total time to cool the brake assembly with the low-pass filter comprises an equation $$t_{Cool\_Filt}[i] = t_{Cool\_Filt}[i-1] + \beta \cdot (t_{Cool}[i] t_{Cool}[i-1])$$

wherein $t_{Cool\_Filt}[i]$ is a first order low-pass filter value at a time interval i, $t_{Cool\_Filt}[i-1]$ is a first order low-pass filter value at a time interval preceding the time interval i, β is a smoothing constant, $t_{Cool}[i]$ is the estimated total time to cool the brake assembly to a predetermined temperature at time interval i, and $t_{Cool}[i-1]$ is the estimated total time to cool the brake assembly to a predetermined temperature at a time interval preceding the time interval i.

6. The system according to claim 5, wherein the estimated total time to cool the brake assembly based on the amount of time elapsed after the receiving the temperature of the brake assembly is adjusted by an equation $$t_{Cool}[n] = t_{Cool\_Filt}[n] - n \cdot P$$

wherein $t_{Cool}[n]$ is the estimated total time to cool the brake assembly to a predetermined temperature at time interval n, $t_{Cool\_Filt}[n]$ is the low-pass filter value at a time interval n, and P is a sampling period.

7. The system according to claim 1, further comprising an output device in at least one of electrical communication and radio frequency ("RF") communication with the processor.

8. A method of estimating a cooling time of a brake assembly, comprising: receiving, by a brake control system unit ("BCSU") comprising a processor and a tangible, non-transitory memory, a temperature of the brake assembly; determining, by the BCSU, a peak brake assembly temperature; determining, by the BCSU, a temperature decay coefficient ("α") of the brake assembly; calculating, by the BCSU, an estimated total time to cool the brake assembly to a predetermined temperature based on the peak brake assembly temperature and an ambient temperature data; and adjusting, by the BCSU, the estimated total time to cool the brake assembly to a predetermined temperature based on an amount of time elapsed after the receiving the temperature of the brake assembly, wherein the BCSU adjusts the estimated total time to cool the brake assembly with a low-pass filter.

9. The method according to claim 8, wherein α is greater than zero and satisfies an equation $$\alpha = \alpha[n] = 1/t_n \cdot \ln(T_{init}/(T_n \cdot T_{amb}))$$

wherein $t_n$ is a period of time after the peak brake assembly temperature, $T_n$ is a temperature of the brake assembly at time $t_n$, $T_{init}$ is the peak brake assembly temperature, and $T_{amb}$ is the ambient temperature data.

10. The method according to claim 9, wherein α[n] is greater than zero and the estimated total time to cool the brake assembly to a predetermined temperature is based on an equation $$t_{Cool}[n] = 1/\alpha[n] \cdot \ln(T_{init}/(T_{Cool} - T_{amb}))$$

wherein $t_{Cool}[n]$ is the estimated total time to cool the brake assembly to a predetermined temperature ("$T_{Cool}$") at time interval n, $T_{init}$ is the peak brake assembly temperature, and $T_{amb}$ is the ambient temperature data.

11. The method according to claim 8, further comprising determining, by the BCSU, whether the brake assembly is currently in a braking event.

12. The method according to claim 8, wherein the low-pass filter comprises filtering the estimated total time to cool the brake assembly with an equation $$t_{Cool\_Filt}[i] = t_{Cool\_Filt}[i-1] + \beta \cdot (t_{Cool}[i] - t_{Cool}[i-1])$$

wherein $t_{Cool\_Filt}[i]$ is a first order low-pass filter value at a time interval i, $t_{Cool\_Filt}[i-1]$ is a first order low-pass filter value at a time interval before the time interval i, β is a smoothing constant, $t_{Cool}[i]$ is the estimated total time to cool the brake assembly to a predetermined temperature at time interval i, and $t_{Cool}[i-1]$ is the estimated total time to cool the brake assembly to a predetermined temperature at a time interval preceding the time interval i.

13. The method according to claim 12, wherein the estimated total time to cool the brake assembly based on the amount of time elapsed after the receiving the temperature of the brake assembly is adjusted by an equation $$t_{Cool}[n] = t_{Cool\_Filt}[n] - n \cdot P$$

wherein $t_{Cool}[n]$ is the estimated total time to cool the brake assembly to a predetermined temperature, $t_{Cool\_Filt}[n]$ is the low-pass filter value at a time interval n, and P is a sampling period.

* * * * *